July 7, 1931.  P. A. MYERS  1,813,309
POWER HEAD FOR PUMPS
Filed July 24, 1929    5 Sheets-Sheet 1

INVENTOR
PHILIP A. MYERS.
BY
ATTORNEY

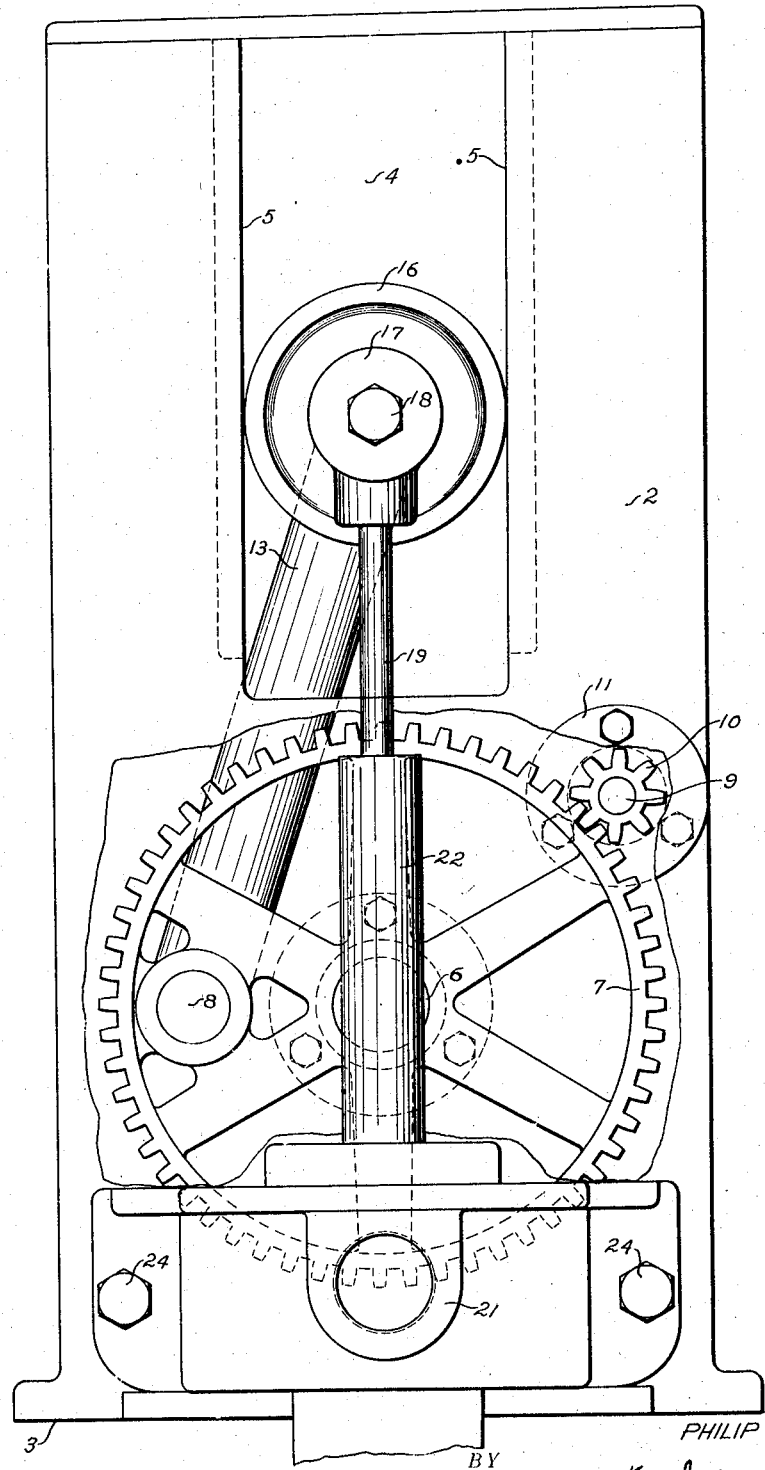

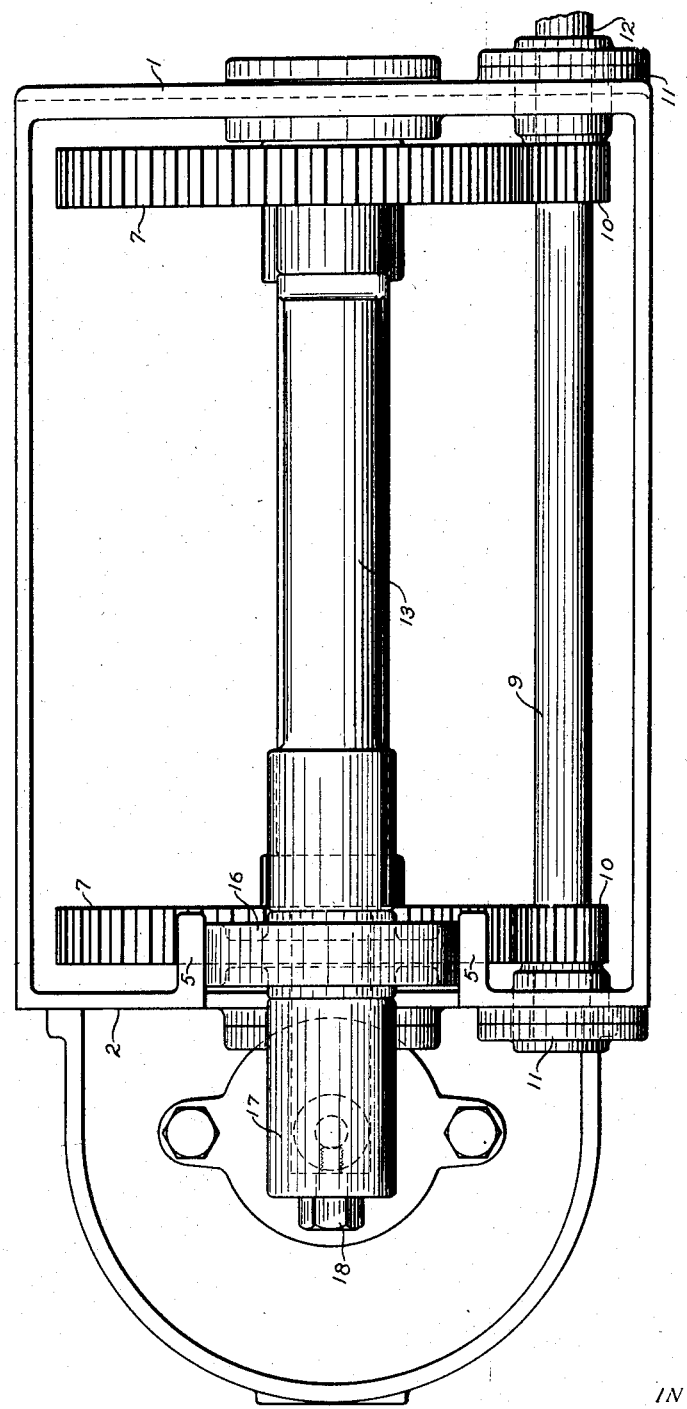

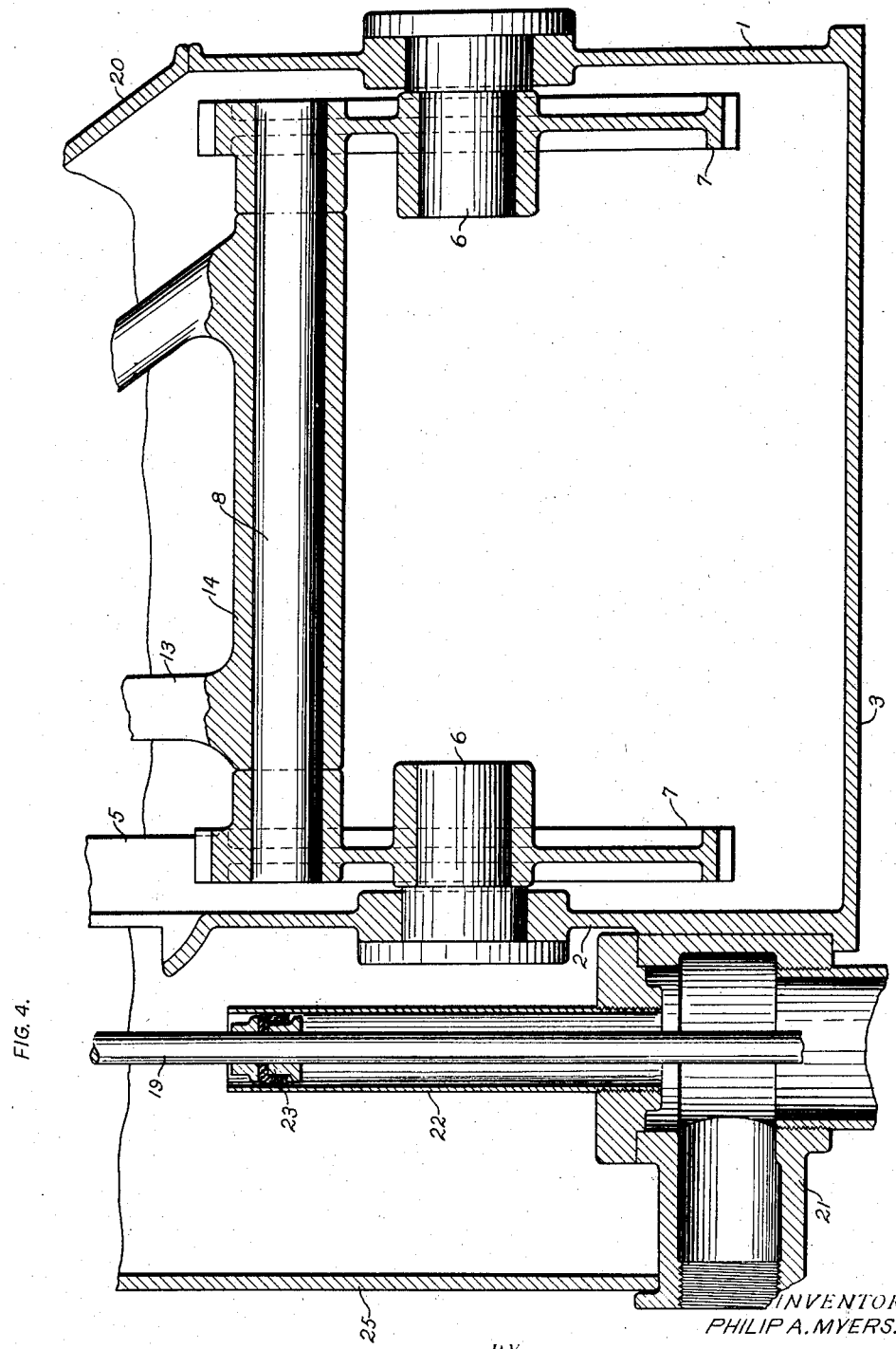

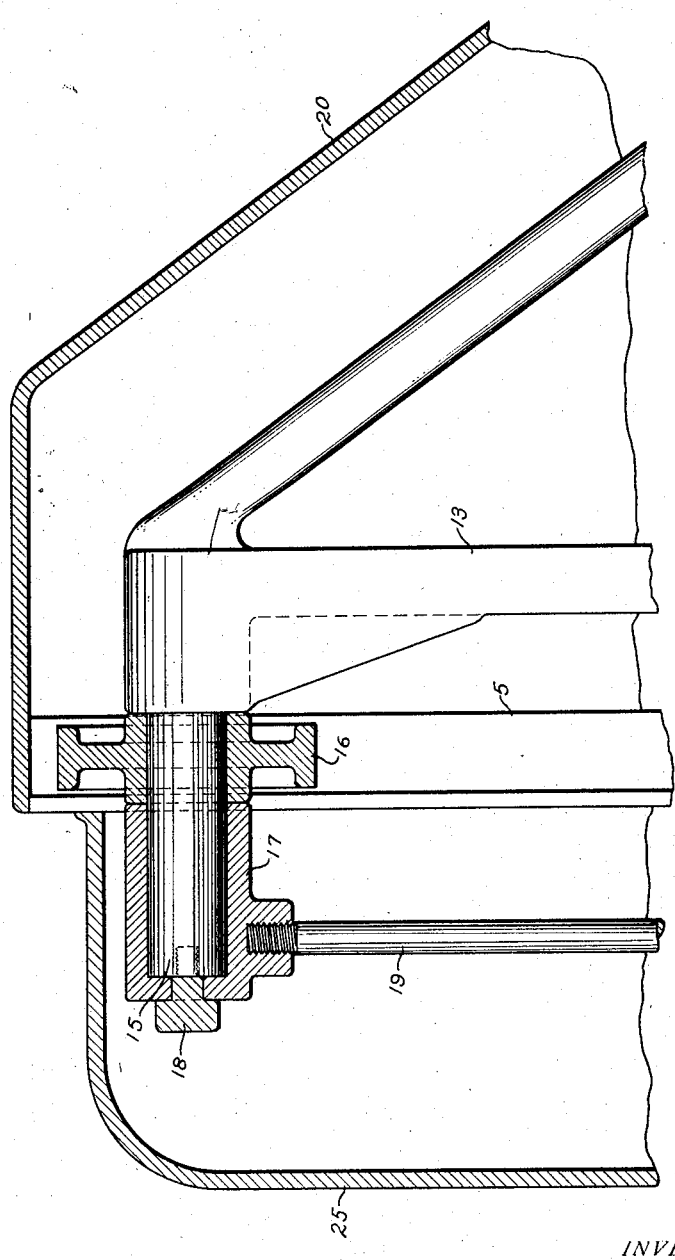

Patented July 7, 1931

1,813,309

UNITED STATES PATENT OFFICE

PHILIP A. MYERS, OF ASHLAND, OHIO, ASSIGNOR TO THE F. E. MYERS AND BRO. COMPANY, OF ASHLAND, OHIO, A CORPORATION OF OHIO

POWER HEAD FOR PUMPS

Application filed July 24, 1929. Serial No. 380,548.

It is an object of this invention to provide a power head for pumps in which the actuating mechanism for the pump rod is in the plane of movement of the pump rod so that there is a direct thrust with a minimum of tortional movement.

It is also an object of this invention to provide driving mechanism for a pump rod in which the connecting link has a long bearing to prevent twisting and tortional movement, and to effect a direct thrust on the piston bearing for the end of the piston rod.

It is also an object of this invention to provide a device of this kind in which the parts are few and so related to each other that there is a minimum of friction and the maximum of efficiency.

It is also an object of this invention to provide a power head inclosed in a case that contains a lubricant for lubricating the different parts of the apparatus.

These and other advantages will appear from the drawings, taken in connection with the description.

Referring to the drawings:

Figure 2 is a rear elevation of the power head.

Figure 3 is a top plan view with the cover removed.

Figure 4 is a partial sectional view showing the lower part of the driving mechanism on a large scale.

Figure 5 is a view showing the connection between the link and the pump rod bearing on a large scale.

Figure 1:
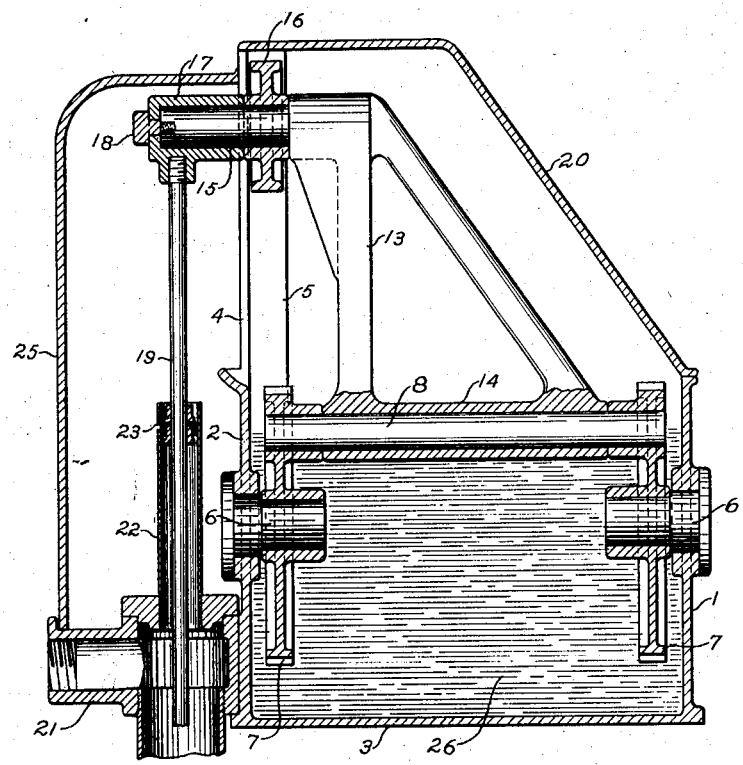
Figure 1 is a vertical section showing the driving gear and the means for attaching said gear to the piston rod.

The numeral 1 is used to designate the front part of a gear casing, 2 the rear part, and the numeral 3 is used to designate the bottom thereof. In the rear wall of the casing there is a slot 4 to accommodate and afford reciprocating space for a spindle. On each side of the slot 4 there is a guide flange 5.

Extending from the front and the rear walls of the casing there is a stub shaft 6. Each stub shaft 6 has mounted thereon for rotation a gear 7. Eccentrically mounted on these gears 7 is a shaft 8, which has pivotally mounted thereon a link for operating the pump. The gears 7 are driven by pinions 10 on a pinion shaft 9, which is rotatably mounted in bearings 11 in the front and rear walls of the gear casing.

The power end of the pinion shaft 9 is indicated by the numeral 12. This shaft may be driven by any suitable power means, such as an electric motor. Pivotally mounted at one end upon the shaft 8 is a link 13. This link 13 is substantially V-shaped, and has a large bearing 14 in engagement with the shaft 8. On the end of the link, remote from the bearing 14, is a spindle 15 which extends through and reciprocates in the slot 4. On this spindle 15, adjacent the link 13, there is located a roller 16 which reciprocates between and is guided by the guide flanges 5. While there is shown in the present drawings a roller 16, this roller may be replaced by a guide block that reciprocates between and is guided by the guide flanges 5.

On the end of the spindle 15 there is a pump rod bearing in the form of a sleeve 17, closed at one end and adapted to fit over the end of the spindle. This bearing is held on the spindle 15 by means of of a screw 18, which is screwed into the end of the spindle. Extending downwardly from the pump rod bearing is a pump rod 19.

For the purpose of forming a complete closure for the operating gear there is provided a cover 20, which is attached to the gear casing and forms a removable part thereof. The numeral 21 is used to designate a discharge head. The upper cylinder 22 is threaded into a flange which is bolted on the discharge head 21. Within this upper cylinder and attached to the pump rod is a plunger 23. The discharge head is attached to the gear casing by means of bolts 24. There is also attached to the back side of the gear casing a pump rod casing 25. This casing entirely incloses the pump rod bearing, the pump rod and the upper cylinder, and at one part rests upon the discharge head so that the above-named parts are entirely inclosed and protected from exposure to dust, dirt and other foreign matter.

The lower part of the gear casing is formed into an oil reservoir, as indicated by the numeral 26. The oil in the reservoir is sufficient to partially cover the gears 7 and their associated parts during the operation of the pump head.

I desire to comprehend within my invention such modifications as may be clearly embraced within my claims and the scope of my invention.

Having thus fully described my invention, what I claim is new and desire to secure by Letters Patent, is:

1. In a power head for pumps, a casing having a guide, a gear rotatably mounted in said casing, a shaft eccentrically mounted on said gear, a link having a relatively long bearing at one end engaging said shaft, a spindle on the other end of said link, a roller on said spindle guided by said guide, and a pump rod attached to said spindle.

2. In a power head for pumps, a casing having a pair of guide flanges thereon, a gear rotatably mounted in said casing, a shaft eccentrically mounted on said gear, a link having a relatively long bearing at one end engaging said shaft, a spindle on the other end of said link, a roller on said spindle guided between said flanges, and a pump rod attached to said spindle.

3. In a power head for pumps, a casing having a guideway and a front and a rear wall, a gear rotatably mounted on each of said walls, an eccentrically mounted shaft on said gears, a bearing on said shaft extending between said gears, a link extending from said bearing and having on the outer end thereof a spindle, a roller on said spindle in said guideway, and a pump rod attached to said spindle.

4. In a power head for pumps, a casing having a guideway and a front and a rear wall, a gear rotatably mounted on each of said walls, an eccentrically mounted shaft on said gears, a bearing on said shaft extending between said gears, a link extending from said bearing and having on the outer end thereof a spindle, said link being composed of an arm at right angles to one end of said bearing and another arm extending obliquely from the other end of said bearing and meeting the first-named arm at the spindle, and a pump rod attached to said spindle and guided by said guideway.

5. In a power head for pumps, a casing having a guideway and a front and a rear wall, a gear rotatably mounted on each of said walls, an eccentrically mounted shaft on said gears, a bearing on said shaft extending between said gears, a link extending from said bearing and having on the outer end thereof a spindle, said link being composed of an arm at right angles to one end of said bearing and another arm extending obliquely from the other end of said bearing and meeting the first-named arm at the spindle, a roller on said spindle moving in said guideway, and a pump rod attached to said spindle.

6. In a power head for pumps, a reciprocable pump rod, a rotatable power transmission means consisting of a pair of spaced gears eccentrically connected by a shaft having its axis of rotation in a plane passing longitudinally through said pump rod, and means engaging said shaft adjacent said gears and connecting said rotatable means to said pump rod whereby rotation of said rotatable means reciprocates said pump rod.

7. In a power head for pumps, a reciprocable pump rod, a rotatable power transmission means consisting of a pair of gears eccentrically connected by a shaft having its axis of rotation in a plane passing longitudinally through said pump rod, and means engaging said shaft and connecting said rotatable means to said pump rod, said last-named means consisting of a pair of converging arms extending from said shaft to said pump rod whereby the pump rod may be reciprocated by the rotation of said rotatable means.

8. In a power head for pumps, a discharge head having a cylinder extending upward therefrom, a pump rod and plunger in said cylinder, a casing attached to said discharge head, said casing having a pair of guide flanges thereon and a front and a rear wall, a stub shaft in each wall in line with said pump rod, a gear on each stub shaft, a shaft connecting said gears near the periphery thereof, a bearing on said last shaft, and a triangular-shaped link extending from said bearing with a spindle on the end thereof engaging said pump rod and a roller on said spindle between said guide flanges.

9. In a power head for pumps, a vertically reciprocatory pump rod, spaced power means rotating on an axis at right angles to the major axis of the pump rod, means connecting said power means rotating therewith and around the axis thereof, and an arm carried thereby extending from the power means and connected to the pump rod, means for guiding the end of the arm in the plane of reciprocation of the pump rod while the other end of the arm is free to move about the axis of rotation of the power means.

10. In a power head for pumps, a vertically reciprocatory pump rod, spaced power means rotating on an axis at right angles to the major axis of the pump rod, means connecting said power means rotating therewith and around the axis thereof, and an arm carried thereby extending from the power means and connected to the pump rod, means for guiding the end of the arm in the plane of reciprocation of the pump rod while the other end of the arm is free to move about the axis of rotation of the power head, the axis of rotation of the power means lying in the same plane as the plane of reciprocation of the pump rod but at right angles to the major axis of said pump rod.

11. In a power head for pumps, a pump rod, a pair of spaced power devices, said rod and devices moving in parallel vertical planes, the axis of rotation of the power devices passing through said pump rod, an arm carried by said power devices eccentrically located with respect to said power devices axis and connected at its other end to the pump rod.

12. In a power head, a casing, driving gears therein axially aligned, an eccentrically mounted pitman carried therebetween extending out of said casing, a pump rod connected to said pitman, and means for guiding said rod in the plane of the center of said gears.

In testimony whereof, I affix my signature.

PHILIP A. MYERS.